(12) United States Patent
Han

(10) Patent No.: US 6,735,519 B1
(45) Date of Patent: May 11, 2004

(54) NAVIGATION METHOD AND SYSTEM OF A VEHICLE

(75) Inventor: Il-Ung Han, Hwaseong (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 10/331,242

(22) Filed: Dec. 30, 2002

(30) Foreign Application Priority Data

Jul. 31, 2002 (KR) ................................ 10-2002-0045270

(51) Int. Cl.$^7$ .............................................. G01C 21/30
(52) U.S. Cl. ...................... 701/210; 701/23; 701/207; 701/211; 340/988; 340/995.17
(58) Field of Search ............................ 701/23, 25, 200, 701/207, 210, 211, 212, 213, 214, 300; 73/178 R; 340/988, 995.17, 995.2

(56) References Cited

U.S. PATENT DOCUMENTS

| | | | | | |
|---|---|---|---|---|---|
| 5,187,810 A | * | 2/1993 | Yoneyama et al. | .......... | 455/509 |
| 5,793,631 A | * | 8/1998 | Ito et al. | .................... | 701/211 |
| 6,047,235 A | * | 4/2000 | Hiyokawa et al. | .......... | 701/201 |

* cited by examiner

*Primary Examiner*—Gertrude A. Jeanglaude
(74) *Attorney, Agent, or Firm*—Morgan Lewis & Bockius LLP

(57) ABSTRACT

When an approaching crossroad is detected on a target route, the method and apparatus of the invention determine if the relevant turn signal is operated before the crossroad, as well as informing the driver of the crossroad. According to the invention, if the relevant turn signal is not operated, routes different from the target route are calculated before the vehicle arrives at the crossroad, and if the vehicle does not follow the target route at the crossroad, the target route is changed according to the vehicle position.

13 Claims, 4 Drawing Sheets

NAVIGATION METHOD AND SYSTEM OF A VEHICLE

FIELD OF THE INVENTION

The present invention relates to a navigation method and system for a vehicle, and more particularly, to a navigation method and system for stable and prompt vehicle guidance when the vehicle passes a crossroad.

BACKGROUND OF THE INVENTION

A recent navigation system for a vehicle stores a digital map in a data storage unit, determines the vehicle position on the digital map, and guides the driver along an optimal route. To guide the vehicle on the route, the navigation system, having calculated a target route to a target place as the optimal route, also indicates an appropriate direction to take when the vehicle approaches a crossroad.

If the vehicle does not follow the target route, but instead proceeds on a different branch of the crossroad, the navigation system has to calculate a new target route based on the branch the vehicle is traveling. However, there are problems with guiding the vehicle in the prior art. For example, if two crossroads are near each other, when a vehicle takes a branch departing from the target route at the first crossroad, a new target route must be calculated before the vehicle arrives at the second crossroad. But the time required to calculate the new target route is not negligibly small, and sometimes it is only after the vehicle arrives at the second crossroad that the calculation of the new target route is completed.

Thus, the vehicle position after the second crossroad does not correspond to the new target route and a new calculation of a new target route must be executed. Therefore, the navigation system does not perform the vehicle route guiding function for a substantially long period.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

A preferred embodiment of a navigation method for guiding a vehicle on a route includes: calculating a target route for guiding the vehicle; detecting a forthcoming crossroad on the target route; displaying a signal for informing of the forthcoming crossroad; determining if a relevant turn signal, corresponding to the target route at the crossroad, is operated before the vehicle arrives at the crossroad; calculating at least one backup route different from the target route at the crossroad, when the relevant turn signal is not operated; determining a current vehicle position after the crossroad; determining if the current vehicle position after the crossroad lies on the target route; and changing the target route when the current vehicle position after the crossroad does not lie on the target route.

It is preferable that the changing of the target route changes the target route to one of backup routes. More preferably, calculating the backup routes calculates backup routes for each branch from the crossroad, and changing the target route changes the target route to a backup route on which the vehicle is positioned after the crossroad.

It is also preferable that determining if a relevant turn signal, corresponding to the target route at the crossroad, is operated is executed when a distance between the vehicle and the crossroad falls within a predetermined distance range. It is also preferable that determining if a relevant turn signal, corresponding to the target route at the crossroad, is operated is executed when an expected time for the vehicle to arrive at the crossroad falls within a predetermined time range.

A navigation system for guiding a vehicle on a route according to a preferred embodiment of the present invention includes a data storage unit for storing digital map data, a display unit for displaying received signals, an electronic control unit, and a turn signal operation detector.

The electronic control unit preferably executes instructions for calculating a target route for guiding the vehicle; detecting a forthcoming crossroad on the target route; displaying a signal for informing of the forthcoming crossroad; determining if a relevant turn signal, corresponding to the target route at the crossroad, is operated before the vehicle arrives at the crossroad; calculating at least one backup route, different from the target route at the crossroad, when the relevant turn signal is not operated; determining a current vehicle position after the crossroad; determining if the current vehicle position after the crossroad lies on the target route; and changing the target route when the current vehicle position after the crossroad does not lie on the target route.

It is also preferable that the exemplary navigation system further includes a GPS signal receiver for receiving GPS signals from a GPS satellite, and accordingly said determining a current vehicle position after the crossroad determines the current vehicle position on a digital map, based on received GPS signals. In a preferred embodiment, the navigation method for guiding a vehicle includes; detecting a current vehicle position; calculating a target route for the vehicle; detecting an approaching crossroad along the target route; displaying a signal informing of the approaching crossroad; determining if a turn signal indicates that the vehicle will follow the target route; calculating a backup route if the turn signal indicates that the vehicle will not follow the target route; determining a post-crossroad current vehicle position after the vehicle has passed the crossroad; determining if the post-crossroad current vehicle position lies on the target route; and changing the target route to the backup route if the post-crossroad current vehicle position does not lie on the target route. Preferably, the method calculates a backup route for each branch of the approaching crossroad.

In an additional embodiment, the method also includes detecting a crossroad on the backup route; and calculating a second backup route corresponding to the crossroad on the backup route.

BRIEF DESCRIPTION OF THE DRAWINGS

The accompanying drawings, which are incorporated in and constitute a part of the specification, illustrate an embodiment of the invention, and, together with the description, serve to explain the principles of the invention.

Like numerals refer to similar elements throughout the several drawings.

DETAILED DESCRIPTION OF THE PREFERRED EMBODIMENTS

Figure 1:
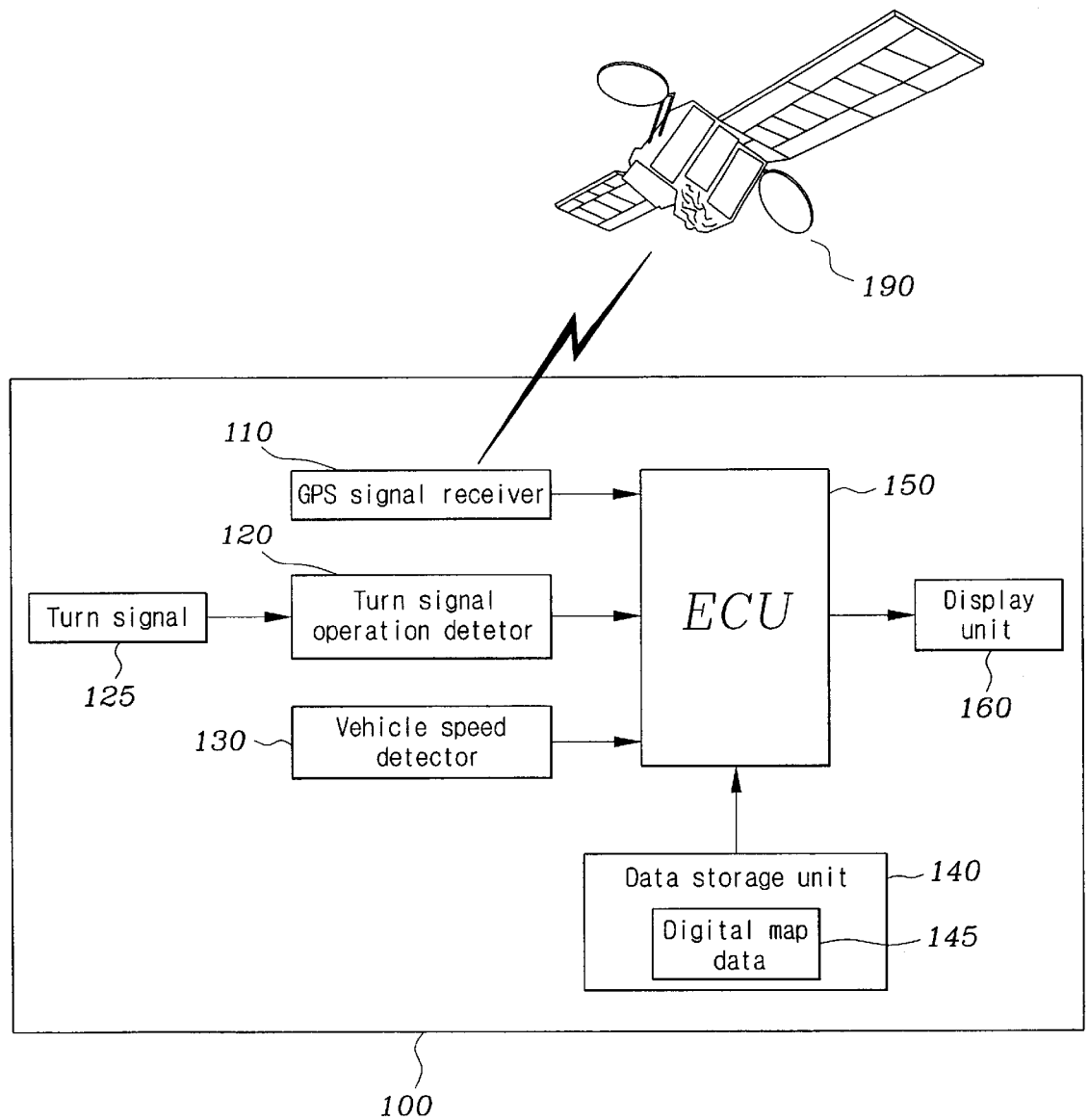
FIG. 1 is a block diagram of a navigation system for guiding a vehicle on a route according to a preferred embodiment of the present invention.

As shown in FIG. 1, a navigation system according to a preferred embodiment of the present invention guides a vehicle 100 on a route, and includes a GPS signal receiver 110 for receiving GPS signals from a GPS satellite 190. A turn signal operation detector 120 detects the operation of turn signals 125 of the vehicle 100. A data storage unit 140 stores digital map data 145. A display unit 160 displays received signals. And, an electronic control unit (ECU) 150 controls the display unit 160 on the basis of signals from the GPS signal receiver 110, the turn signal operation detector 120, and the digital map data 145.

The ECU 150 is connected with a vehicle speed detector 130 so the ECU 150 receives a vehicle speed signal from the vehicle speed detector 130. The ECU 150 can be one or more processors activated by software programmed to perform each step of a navigation method according to a preferred embodiment of the present invention. Persons of ordinary skill in the art may select appropriate processors and associated memory and other necessary hardware and software based on the teachings of the present invention.

The display unit 160 can be a variety of apparatuses, for example, a display unit for visually displaying signals such as an LCD monitor, or a display unit for audibly displaying signals such as a speaker. The GPS signal receiver 110, the turn signal operation detector 120, the vehicle speed detector 130, the data storage unit 140, and the digital map data 145 will be apparent to a person skilled in the art.

Figure 2:
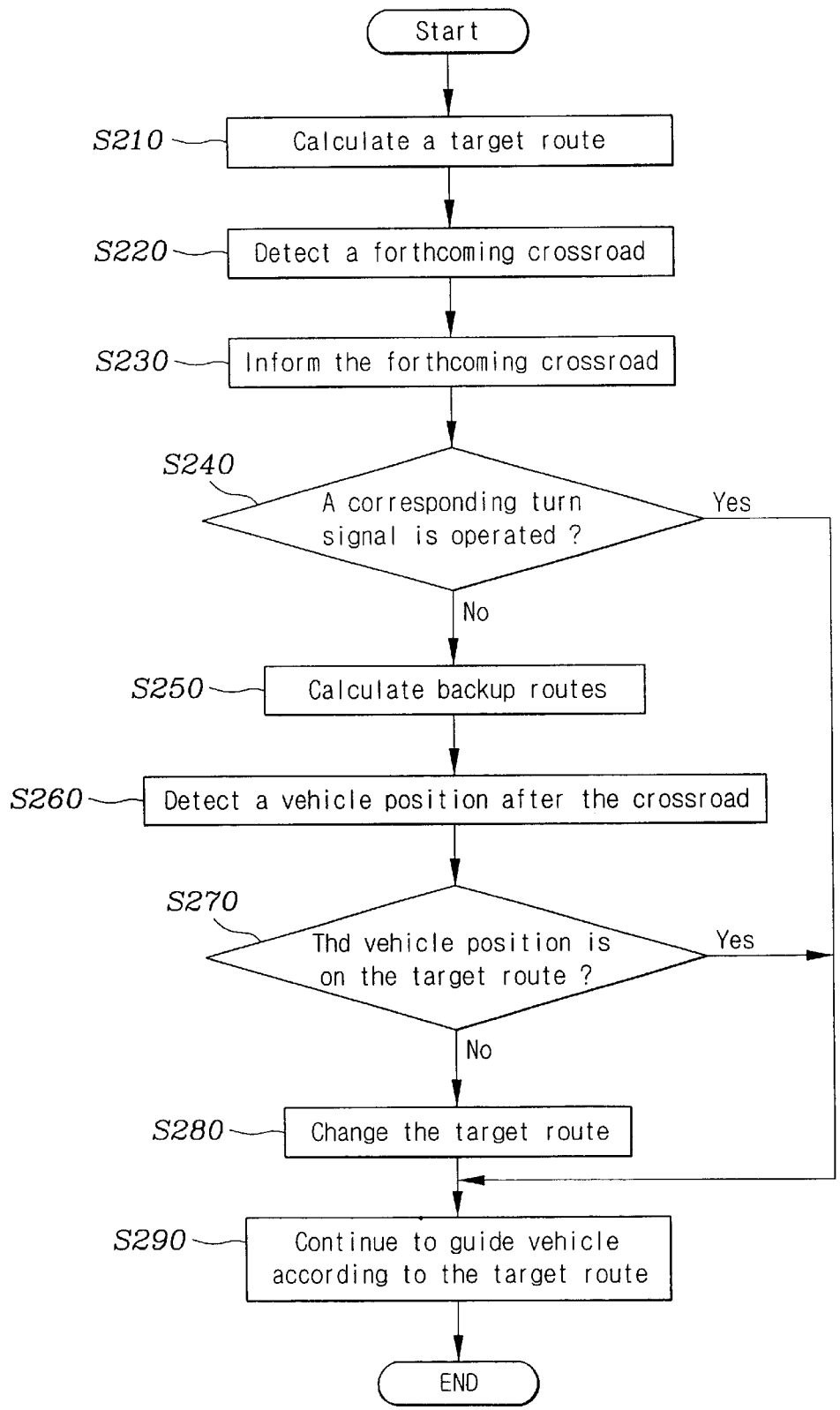
FIG. 2 is a flowchart showing a navigation method for guiding a vehicle on a route according to a preferred embodiment of the present invention.

Referring to FIG. 2, the current position of the vehicle 100 is determined using a variety of methods. For example, a road information transceiver (usually called a "beacon") on a roadside can be a source of such current position information. Preferably, the ECU 150 continually determines the current vehicle position on the basis of a GPS signal received from the GPS satellite 190 via the GPS signal receiver 110. At step S210, the ECU 150 calculates a target route for the vehicle 100 on a digital map retrieved from the data storage unit 140. The digital map may have a variety of formats well known to a person of ordinary skill in the art. At step S220, the ECU 150 detects a crossroad approaching the vehicle 100. The crossroad may have any form of branching, from being cross-shaped to having a single branch. And the target route may be to go straight through the crossroad.

At step S230, the ECU 150 sends signals for informing the display unit 160 of the forthcoming crossroad and accordingly the signals for informing the driver of the forthcoming crossroad are displayed at the display unit 160. The signal for informing of the forthcoming crossroad may be a sign or mark when the display unit 160 is a visual display unit, and it may be a sound or voice when the display unit 160 is an audible display unit. At step S240, before the vehicle 100 arrives at the crossroad, the ECU 150 determines if the relevant turn signal of the turn signals 125 corresponding to the target route at the crossroad is operated using turn signal operation detector 120.

Figure 3:
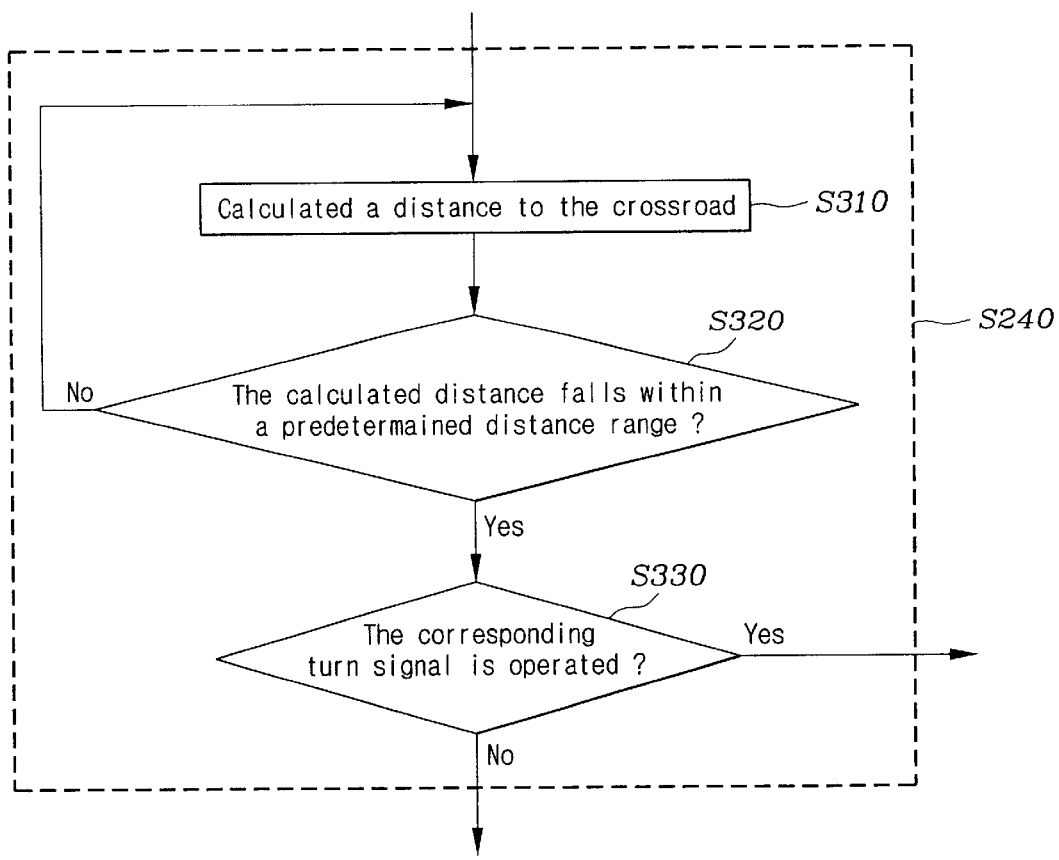
FIG. 3 is a detailed flowchart for determining if a relevant turn signal corresponding to the target route at the crossroad is operated before the vehicle arrives at the crossroad according to a preferred embodiment of the present invention.

The determining step S240 may be executed as follows as shown in FIG. 3. At step S310, the ECU 150 calculates the distance between the vehicle 100 and the crossroad. At step S320 the ECU 150 determines if the calculated distance falls within a predetermined distance range. If so, the ECU 150 determines, at step S330, if the relevant turn signal is operated.

Figure 4:
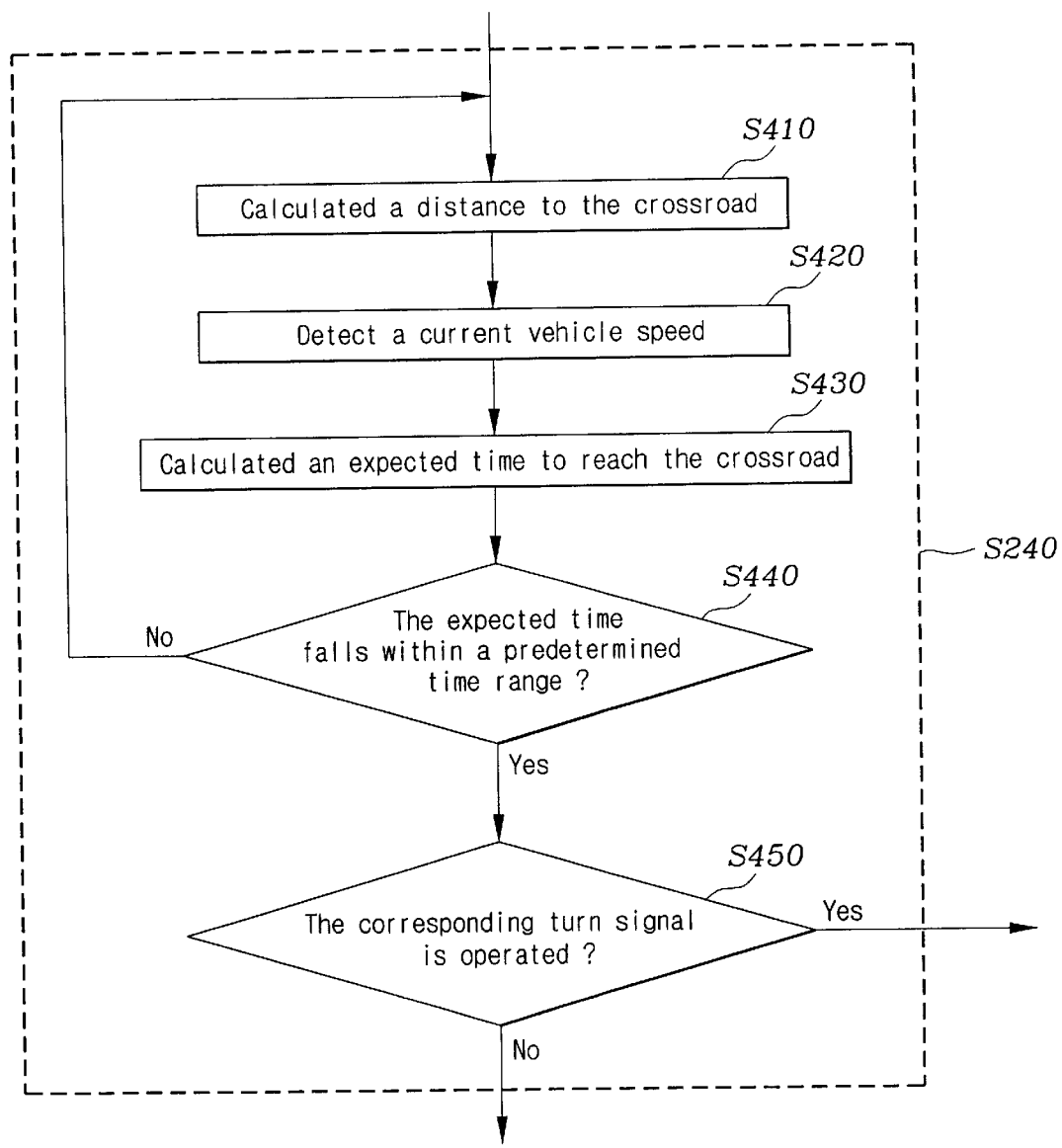
FIG. 4 is a detailed flowchart for determining if a relevant turn signal corresponding to the target route at the crossroad is operated before the vehicle arrives at the crossroad according to another preferred embodiment of the present invention.

The determining step S240 may also be executed, as shown in FIG. 4. At step S410 the ECU 150 calculates a distance from the vehicle 100 to the crossroad. At step S420, the ECU 150 detects the current vehicle speed. At step S430 the ECU 150 calculates an expected time for the vehicle 100 to arrive at the crossroad. At step S440 the expected time is compared with a predetermined time range and if the expected time falls within the predetermined time range, the ECU 150 determines, at step S450, if the relevant turn signal is operated. The relevant turn signal, in step S240, may be a left turn signal, a right turn signal, or no signal, indicating that the vehicle will not turn.

Referring back to FIG. 2, when it is determined that the relevant turn signal is operated at step S240, the vehicle 100 is expected to proceed along the target route. Therefore, at step S290 the ECU 150 continues guiding the vehicle on a route based on the target route.

When it is determined that the relevant turn signal is not operated at step S240, then the ECU 150 calculates, at step S250, backup routes corresponding to possible directions of branches departing from the target route. Step S250 is executed before the vehicle 100 arrives at the crossroad. Therefore, if the vehicle does not follow the target route at the crossroad, the period required for guiding the vehicle 100 according to a new route after passing the crossroad is reduced. Since the backup routes are calculated before the vehicle arrives at the crossroad, the ECU 150 can guide the vehicle 100 promptly after passing the crossroad.

Therefore, it is preferable that the predetermined distance and/or time range is preset so that sufficient time is provided for the ECU 150 to calculated the backup routes before the vehicle 100 arrives at the crossroad. Specific values of such may vary based on data processing performance of the ECU 150, and would be apparent to a person of ordinary skill in the art.

Therefore, the step S250 of calculating the backup routes calculates backup routes with respect to at least one branch selected from the branches departing from the target route. Preferably, the ECU 150 calculates a backup route for each branch departing from the target route. For example, a vehicle route may be based on arbitrarily determined standards, such as assuming the driver makes a logical choice. The ECU 150 may calculate only the backup route that corresponds to the logical vehicle route. However, it is more preferable that the ECU 150 calculates all possible backup routes before the vehicle 100 arrives at the crossroad, even the illogical routes. This increases the stability of the navigation method and system. The step S250 of calculating the backup routes is executed in the background of the ECU while it is guiding the vehicle 100, although execution of the step S250 may or may not be displayed at the display unit 160. Additionally, the ECU 150 may detect a second crossroad along one of the backup routes and calculate backup routes for that second crossroad, as well.

At step S260, after the vehicle 100 has passed the crossroad, the ECU 150 determines the current vehicle position. At step S270, the ECU determines if the current vehicle position lies on the target route. If so, at step S290 the ECU 150 continues guiding the vehicle on a route based on the target route without changing the target route.

If it is determined that the current vehicle position after the crossroad does not lie on the target route, at step S280 the ECU 150 changes the target route. The target route is preferably changed to one of the backup routes calculated in step S250. If the backup routes include the branch on which the vehicle is currently positioned after the crossroad, the target route is changed to the route containing that branch. After the ECU 150 changes the target route at step S280, the ECU 150 continues guiding the vehicle based on the changed target route at step S290.

Thus, if a vehicle takes a branch of a crossroad that departs from the target route, a preferred embodiment of the present invention reduces the period necessary for the navigation system to guide the vehicle according to a new target route.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

Throughout this specification and the claims which follow, unless explicitly described to the contrary, the word "comprise" or variations such as "comprises" or "comprising" will be understood to imply the inclusion of stated elements but not the exclusion of any other elements.

What is claimed is:

1. A navigation method for guiding a vehicle on a route comprising:
    calculating a target route for guiding the vehicle;
    detecting an approaching crossroad on the target route;
    displaying a signal for informing of the forthcoming crossroad;
    determining if a turn signal corresponding to the target route at the crossroad is operated before the vehicle arrives at the crossroad;
    calculating at least one backup route when the relevant turn signal is not operated;
    determining a current vehicle position after the crossroad;
    determining if the current vehicle position after the crossroad lies on the target route; and
    changing the target route when the current vehicle position after the crossroad does not lie on the target route.

2. The method of claim 1, wherein said changing the target route changes the target route to one of said at least one backup routes.

3. The method of claim 1, wherein said calculating at least one backup route calculates a backup route for each branch of the crossroad departing from the target route, and said changing the target route changes the target route to a backup route on which the vehicle is currently positioned after the crossroad.

4. The method of claim 1, wherein said determining if a relevant turn signal is operated is executed when a distance between the vehicle and the crossroad falls within a predetermined distance range.

5. The method of claim 1, wherein said determining if a relevant turn signal is operated is executed when an expected time for the vehicle to arrive at the crossroad falls within a predetermined time range.

6. A navigation system for guiding a vehicle on a route comprising:
    a turn signal operation detector for detecting operation of turn signals;
    a data storage unit for storing digital map data;
    a display unit for displaying received signals; and
    an electronic control unit, wherein the electronic control unit executes instructions for calculating at least one backup route for an approaching crossroad.

7. The navigation system of claim 6, wherein said calculating at least one backup routes calculates a backup route for each branch of the crossroad departing from a target route and said instructions further comprise changing the target route to a backup route on which the vehicle is currently positioned after the crossroad.

8. The navigation system of claim 6, said instructions further comprising determining if a relevant turn signal is operated when a distance between the vehicle and the crossroad falls within a predetermined distance range.

9. The navigation system of claim 6, said instructions further comprising determining if a relevant turn signal is operated when an expected time for the vehicle to arrive at the crossroad falls within a predetermined time range.

10. The navigation system of claim 6 further comprising a GPS signal receiver for receiving GPS signals from a GPS satellite, and wherein said instructions further comprise determining a current vehicle position after the crossroad using the digital map data based on received GPS signals.

11. A navigation method for guiding a vehicle, comprising:
    detecting a current vehicle position;
    calculating a target route for the vehicle;
    detecting an approaching crossroad along the target route;
    displaying a signal informing of the approaching crossroad;
    determining if a turn signal indicates that the vehicle will follow the target route;
    calculating a backup route if the turn signal indicates that the vehicle will not follow the target route;
    determining a post-crossroad current vehicle position after the vehicle has passed the crossroad;
    determining if the post-crossroad current vehicle position lies on the target route; and
    changing the target route to the backup route if the post-crossroad current vehicle position does not lie on the target route.

12. The method of claim 11, wherein the calculating a backup route calculates a backup route for each branch of the approaching crossroad.

13. The method of claim 11, further comprising:
    detecting a crossroad on the backup route; and
    calculating a second backup route corresponding to the crossroad on the backup route.

* * * * *